US009128986B2

(12) United States Patent
Dhake et al.

(10) Patent No.: US 9,128,986 B2
(45) Date of Patent: Sep. 8, 2015

(54) METHOD AND SYSTEM FOR MANAGING A DATABASE HAVING A PLURALITY OF TABLES

(75) Inventors: Dhiraj Dhake, Pune (IN); Abhay Mohata, Pune (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/246,747

(22) Filed: Sep. 27, 2011

(65) Prior Publication Data
US 2013/0007047 A1    Jan. 3, 2013

(30) Foreign Application Priority Data
Jun. 29, 2011    (IN) .......................... 2189/CHE/2011

(51) Int. Cl.
G06F 7/00    (2006.01)
G06F 17/30    (2006.01)

(52) U.S. Cl.
CPC ........ *G06F 17/3048* (2013.01); *G06F 17/3056* (2013.01); *G06F 17/30286* (2013.01); *G06F 17/30557* (2013.01); *G06F 17/30917* (2013.01)

(58) Field of Classification Search
None
See application file for complete search history.

(56) References Cited

U.S. PATENT DOCUMENTS

| | | | |
|---|---|---|---|
| 6,466,971 B1 | 10/2002 | Humpleman et al. | |
| 6,546,419 B1 | 4/2003 | Humpleman et al. | |
| 6,581,094 B1 | 6/2003 | Gao | |
| 6,585,778 B1 | 7/2003 | Hind et al. | |
| 6,618,764 B1 | 9/2003 | Shteyn | |
| 6,725,281 B1 | 4/2004 | Zintel et al. | |
| 6,738,951 B1 | 5/2004 | Weiss et al. | |
| 6,763,460 B1 | 7/2004 | Hild et al. | |
| 6,788,768 B1 | 9/2004 | Saylor et al. | |
| 6,798,867 B1 | 9/2004 | Zirngibl et al. | |
| 6,826,597 B1 | 11/2004 | Lonnroth et al. | |
| 7,032,181 B1 | 4/2006 | Farcasiu | |
| 7,043,532 B1 | 5/2006 | Humpleman et al. | |
| 7,065,562 B2 | 6/2006 | Courtney | |
| 7,162,534 B2 | 1/2007 | Schleiss et al. | |
| 7,184,801 B2 | 2/2007 | Farcasiu | |
| 7,356,615 B2 | 4/2008 | Cai et al. | |
| 7,607,081 B1 * | 10/2009 | Jones et al. | 715/234 |
| 7,685,127 B2 * | 3/2010 | Gauweiler | 707/999.01 |
| 7,840,631 B2 | 11/2010 | Farcasiu | |

(Continued)

OTHER PUBLICATIONS

Wolter, et al., "The What, Why, and How of Master Data Management," Microsoft Corporation, Nov. 2006, 11 pages.

(Continued)

*Primary Examiner* — Augustine K Obisesan
*Assistant Examiner* — David T Brooks
(74) *Attorney, Agent, or Firm* — Klarqiust Sparkman, LLP

(57) ABSTRACT

The present disclosure describes methods and systems for managing a database having a plurality of tables. The tables represent master data of a business application. In one example, a method includes receiving an input command from a user for maintaining a table of the plurality of tables. After receiving the command, an Extensible Markup Language (XML) file corresponding to the table is identified. Thereafter, a screen suitable for enabling the user to perform one or more functionalities corresponding to the input command is prepared. The screen is prepared by using a screen object corresponding to the XML file. Various examples of the functionalities can include, but are not limited to, View, Add, Update, and Delete. Subsequently, a query corresponding to the input command is executed for maintaining the table based on the functionalities.

41 Claims, 7 Drawing Sheets

(56) References Cited

U.S. PATENT DOCUMENTS

| | | | |
|---|---|---|---|
| 7,890,091 B2 | 2/2011 | Puskoor et al. | |
| 8,145,681 B2 * | 3/2012 | Macaleer et al. | 707/803 |
| 2002/0087655 A1 | 7/2002 | Bridgman et al. | |
| 2004/0103073 A1 * | 5/2004 | Blake et al. | 707/1 |
| 2006/0143223 A1 * | 6/2006 | Ivanova | 707/103 R |
| 2007/0214179 A1 | 9/2007 | Hoang | |
| 2007/0288424 A1 * | 12/2007 | Neil | 707/2 |
| 2008/0270363 A1 | 10/2008 | Hunt et al. | |
| 2008/0294583 A1 | 11/2008 | Hunt et al. | |
| 2008/0294996 A1 | 11/2008 | Hunt et al. | |
| 2009/0006156 A1 | 1/2009 | Hunt et al. | |
| 2009/0012971 A1 | 1/2009 | Hunt et al. | |
| 2009/0018996 A1 | 1/2009 | Hunt et al. | |
| 2009/0055424 A1 * | 2/2009 | Zhuang et al. | 707/102 |
| 2009/0265608 A1 * | 10/2009 | Molenaar | 715/234 |
| 2009/0313279 A1 * | 12/2009 | Tomaszewski | 707/102 |
| 2011/0040801 A1 * | 2/2011 | Macaleer et al. | 707/803 |
| 2011/0078201 A1 | 3/2011 | Ryan et al. | |
| 2013/0060825 A1 | 3/2013 | Farcasiu et al. | |

OTHER PUBLICATIONS

Wikipedia, "Master Data Management," downloaded from the Internet on Jul. 11, 2011, 5 pages.

Wolter, "Master Data Management (MDM) Hub Architecture," Microsoft Corporation, Apr. 2007, 18 pages.

* cited by examiner

FIG. 5

View Packaging Types

| Package Code | Package Name | Max Pieces | Avg. max weight | Delete |
|---|---|---|---|---|
| Accvbhh | ABC Flyor | 4 | 4 | |
| GBhju | Jumbo Box | 1 | 22 | |

Default Packaging Type: ABC Flyor

Add  Delete

Update Packaging Types

| Package Code | Package Name | Max Pieces | Avg. max weight |
|---|---|---|---|
| Accvbhh | ABC Flyor | 4 ▽ | 50.0 ▽ |

Save   Cancel

METHOD AND SYSTEM FOR MANAGING A DATABASE HAVING A PLURALITY OF TABLES

CROSS REFERENCE TO RELATED APPLICATION

This application claims the benefit of and priority to prior Indian patent application number 2189/CHE/2011, entitled "METHOD AND SYSTEM FOR MANAGING A DATABASE HAVING A PLURALITY OF TABLES," filed on Jun. 29, 2011, the entire disclosure of which is hereby incorporated herein by reference.

FIELD

The present disclosure relates, in general, to the field of data maintenance and, in particular, to methods and systems for managing databases having a plurality of tables.

BACKGROUND

In Information Technology (IT), software applications are important for running any business, and these applications act as the backbone of e-business. Examples of such applications include Supply Chain Management (SCM), Customer Relationship Management (CRM), Enterprise Content Management (ECM), and Enterprise Resource Planning (ERP). Typically, these software applications process large amounts of data, which is referred to by a main application or different applications. Such reference data is known as master data. For instance, in ERP systems, the master data includes customer data, item data, and account data. In addition, the master data includes information on products, item codes, and suppliers for the supply chain system. Additionally, in a finance system, the master data includes information on cost centers, department codes, and company hierarchies. Typically, the master data is present in a database in the form of one or more tables. The master data can be defined as the information required for core business entities to capture business transactions and to measure results of these entities. The master data is the data that drives the organization system, such as ERP & business intelligence, and therefore it is often one of the key assets and the core data of any organization. The immense importance of the master data elucidates that it is mandatory to maintain it.

Although a number of solutions are available in the market for maintaining the master data, there are a number of disadvantages associated with these solutions. One of the disadvantages is that these solutions follow a traditional approach of having a business component, a data component, and a presentation component for each table present in the database. Further, the data component, the business component, and the presentation component need to be developed separately for each table present in the database. Pursuant to this, the effort involved in maintaining master data is a multiple of the total number of tables that need to be maintained; thus, a significant amount of effort is required to use these solutions. A huge cost and time is also incurred while developing the components as above. Further, existing solutions focus on a code-duplication approach, leading to an accumulation of a large amount of code, which is difficult to maintain. Moreover, these solutions provide a framework that is not re-usable across different IT applications and/or platforms.

In view of the foregoing discussion, there is a need for designing a framework to maintain multiple data tables present in a database such that development effort, time, and cost are significantly reduced. The framework must focus on minimizing code duplication, thereby increasing the maintainability of a business application. Additionally, the framework should be re-usable across different IT applications.

SUMMARY

The disclosed technology includes methods for managing databases having one or more tables. In one example, a method includes receiving an input command from a user for maintaining a selected table of the one or more tables. In accordance with certain embodiments of the disclosed technology, an input command is present in an XML file. After receiving the command, an Extensible Markup Language (XML) file corresponding to the table is identified. The XML file is identified based on an input command provided by a user. Thereafter, a screen suitable for enabling the user to perform one or more functionalities corresponding to the input command is prepared. The screen is prepared by utilizing screen objects corresponding to the XML file. In accordance with certain embodiments of the disclosed technology, the same screen classes can be used for all tables. Various examples of the functionalities can include, but are not limited to, View, Add, Update, and Delete. Subsequently, a query corresponding to the input command is executed for maintaining the table based on the functionalities.

The disclosed technology further comprises systems for managing databases having one or more tables. As disclosed, an exemplary system includes a receiving module, a function module, an identification module, a screen preparation module, and a query processing module. The receiving module is configured for receiving an input command from a user for maintaining a table of the one or more tables. The input command can include at least one or more of the following: View, Add, Update, and Delete. Further, the function module is configured for processing the input command for maintaining the table. After processing the input command, the identification module identifies an Extensible Markup Language (XML) file corresponding to the table, the XML file being identified based on the input command. Thereafter, the screen preparation module prepares a screen suitable for enabling a user to perform the functionalities corresponding to the input command. The screen is prepared by utilizing a screen object corresponding to the XML file. After preparing the screen, the query processing module executes a query corresponding to the input command for maintaining the table based on the functionalities.

Additionally, certain embodiments of the disclosed technology include Computer Program Product (CPP) for use with a computer. The CPP includes a computer readable storage medium having a computer executable program code embodied therein for managing a database having one or more tables. The computer executable program code includes program instructions for receiving an input command from a user for maintaining a selected table of the one or more tables. The computer executable program code further includes program instructions for identifying an XML file corresponding to the table, the XML file being identified based on the input command. Furthermore, the computer executable program code includes program instructions for preparing a screen suitable for enabling the user to perform one or more functionalities corresponding to the input command, the screen being prepared using a screen object corresponding to the XML file. Moreover, the computer executable program code includes program instructions for executing a query corresponding to the input command for maintaining the table based on the functionalities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

Various examples of the disclosed technology will, hereinafter, be described in conjunction with the appended drawings provided to illustrate, wherein like designations denote like elements.

FIG. 5 depicts an exemplary snapshot of a View screen enabling a user to perform one or more functionalities, in accordance with certain embodiments of the disclosed technology.

FIG. 6 depicts an exemplary snapshot of an Update/Add screen enabling a user to perform one or more functionalities, in accordance with certain embodiments of the disclosed technology.

FIG. 7 illustrates a generalized example of a suitable computing environment in which described embodiments, techniques, and technologies can be implemented.

DETAILED DESCRIPTION

Figure 1:
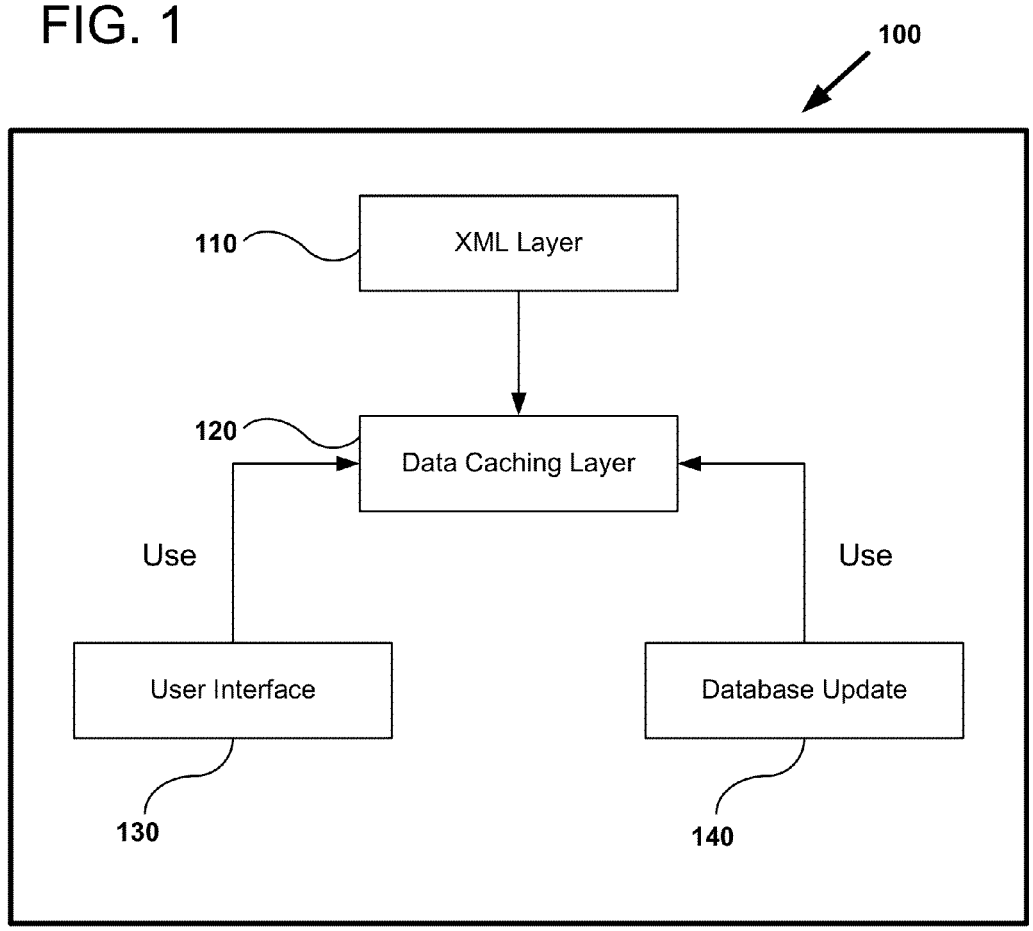
FIG. 1 illustrates an exemplary environment in which certain embodiments of the disclosed technology can be practiced.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented with computer-executable instructions stored on one or more computer-readable storage media (e.g., non-transitory computer-readable media, such as one or more volatile memory components (such as DRAM or SRAM), or nonvolatile memory components (such as hard drives) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, JavaScript, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

In the field of Information Technology (IT), software (or business) applications have data storage and hence, typically use some User Interface (UI) for data maintenance, and in particular, for master data maintenance. In view of this, the present disclosure proposes a framework for maintaining the master data of a business application, for example, a plurality of tables. The framework is used to develop an admin application for managing the plurality of tables present in a database. Various examples of operations (functionalities) that can be performed on the tables include, but are not limited to, View, Add, Update, and Delete. For managing the tables, one business component, one data component, one controller servlet and four Java Server Pages (JSPs) are developed. The business component is developed through four methods such as View, Add, Update, and Delete. The data component is developed for accessing the database. The JSPs are used for preparing the View, Add, Update, and Delete Screens. Further, the Servlet is used for controlling the flow between the JSPs based on user input. At least some of the data, including queries, tables, columns, fields, and the like is stored in the form of Extensible Markup Language (XML). At the time of enhancement in the main business application, for instance, an enhancement results in the addition of 10 tables, few changes are required to be made only in the XML file and no changes are required in the code. In this way, the framework reduces the development time as well increases the maintainability of business application to a great extent. The disclosed frameworks can be used across different IT applications.

FIG. 1 illustrates an exemplary environment in which certain embodiments of the disclosed technology can be practiced. More particularly, FIG. 1 as shown includes an XML-based framework 100. The framework 100 is used to develop master data maintenance User Interface (UI) applications 130, more commonly known as admin applications. Through these admin applications, a user is able to View, Add, Update, and Delete the master data of business applications. Typically, the master data of a business application is present in a database in the form of one or more tables. Further, framework 100 can be used along with any of a number of presentation and persistence frameworks to develop such admin applications. While developing the admin application, a developer is free to choose his or her own UI and persistence framework and accordingly, the entire admin application can be developed using the framework 100. The framework 100 further includes one or more business rules. The business rules can be used to retrieve data from the database to understand which data are to be persisted in which database structure and to interpret how to prepare/design the UI application. These rules are stored in the form of XML; therefore these can be modified and/or added easily, without increasing development time. Moreover, the same rules can be used dynamically to prepare the UI or persistence of the data, thereby avoiding the development of hard-coded UIs. Thus, use of the framework 100 reduces the development time as well increases the maintainability of the business application to a great extent.

The framework 100 includes a ".jar" file and an XML file which can be modified and/or copied to create more XML files according to the requirement of the main business application. For instance, an XML file developed for a single table can be modified to create XML files for multiple tables that are to be maintained. The framework 100 can be used by a Web application. In accordance with another embodiment of the disclosed technology, the framework 100 can be used by a stand-alone client application. Typically, (for caching) applications using the framework 100 call the classes in the ".jar" either when the application starts or whenever there is an update in the XML files. Accordingly, all or a portion of the data available in the XML form is put in the application's cache in the form of Java objects. These Java objects can be used by the application to develop View, Add, Update, and Delete functionalities, where the functionalities are developed based on the input provided by the user.

In accordance with certain embodiments of the disclosed technology, the framework 100 can also be used by client-server application or any other type of application for which Master Data Maintenance is use.

As shown in FIG. 1, a framework 100 includes an XML layer 110, a data caching layer 120, a user interface module 130, and a database update module 140. The XML layer 110 creates one or more XML files according to a specification of functionality. In particular, an XML file is created for each table for which any of the four operations, including View, Add, Update, and Delete are to be performed through an admin application. The XML file is created in a pre-defined format. Each XML file includes data for operations such as View, Add, Update, and Delete for one table. All the data such as tables, queries, and fields, are stored in the form of XML.

The data caching layer 120 caches the data present in the XML file. In accordance with certain embodiments of the disclosed technology, data such as business rules, column names, and database queries are stored in the XML file. Initially, all XML files are parsed by a parser, such as an XML parser, and accordingly, the data is prepared in the form of objects, such as Java objects. In accordance with certain embodiments of the disclosed technology, the XML file is parsed at the start of the program to build the appropriate screen (table) objects which help to perform the adequate actions on the tables present in the database as well as the preparation of the screen. Each screen (table) object is associated with a corresponding XML file. Further, each screen (table) object is associated with a screen identifier. This identifier is used by the JSP to identify the screen (table) object corresponding to the XML file.

The objects in cache can be used by the application to either prepare the screen (View Screen, Add Screen, Update Screen, and Delete Screen) or to update the database records (for example, to view, add, update, or delete the database records). As described above, various examples of objects can include, but are not limited to, Singleton, AdminTableXMLVO, AdminScreenXMLVO, MessageVO, PreparedQueryVO, ParameterVO, ColumnXMLVO, and ColumnVO.

In accordance with certain embodiments of the disclosed technology, objects formed during parsing are described below in detail.

A singleton object includes HashMap with key and value pairs. The key can be a Table Identifier (ID), and the value pair can represent an AdminTableXMLVO object for each XML table.

An AdminTableXMLVO object further includes one or more objects/parameters, which include, but are not limited to, at least one or more of the following: Boolean verticalView, Boolean multiplePrimaryKeyInView, String tableWidth, AdminScreenXMLVO viewScreen, AdminScreenXMLVO updateScreen, AdminScreenXMLVO addScreen, and AdminScreenXMLVO deleteScreen.

A Boolean verticalView parameter indicates whether the screen depicting the table data is to be displayed in a vertical or a horizontal format.

A Boolean multiplePrimaryKeyInView parameter describes whether the screen/table has a compound primary key.

A string tableWidth describes the width of the table to be shown on the screen.

An AdminScreenXMLVO viewScreen contains data for View screen.

An AdminScreenXMLVO updateScreen contains data for Update screen.

An AdminScreenXMLVO addScreen contains data for Add screen.

An AdminScreenXMLVO deleteScreen contains data for Delete screen.

An AdminScreenXMLVO object defines data (e.g., column name) to be shown on the screen, table data (e.g., database column name), and query data. The AdminScreenXMLVO object further includes a list footerMessages, a list headerMessages, column objects, and so forth. In particular, the AdminScreenXMLVO object includes a list of MessageVO, PreparedQueryVO, and ColumnXMLVO objects.

The MessageVO object includes data to be shown in the header and footer messages of the screen. The MessageVO object can be static or dynamic in nature. Further, the MessageVO object includes String Data and PreparedQueryVO objects. String data represents the message that is to be shown on the screen. The PreparedQueryVO objects are used when the message contains dynamic data that is to be fetched from the database. In examples where the information is static, the object is NULL.

The PreparedQueryVO object includes a prepared Query to be submitted to the database and the parameters to be used while preparing the query. The PreparedQueryVO object includes String Query, which is used to View, Add, Update, and Delete data from the database. The PreparedQueryVO object lists ParameterVO objects.

The ParameterVO object includes data to be used while running the Prepared Query. The ParameterVO object further includes String name, Boolean in Session, and Boolean blobData. String name represents the database column Name. The Boolean in Session describes whether the column value needs to be added in the session or not. Further, the Boolean blobData describes whether the datatype of the column is Blob or not.

Continuing the description of the objects above, a ColumnXMLVO object includes details about table columns and their representation on the screen. The ColumnXMLVO object further includes a ColumnVO object and a PreparedQueryVO object. The ColumnVO object contains detailed information about each column. In particular, the ColumnVO object contains a String columnName, a String displayName, a String dataType, a String fieldLength, a Boolean mandatoryFlag, a String description, a String boxType, a String boxSize, a Boolean primaryKeyFlag, a String maxValue, and a Map columnData.

A String columnName represents database column name.

A String displayName describes column display name on screen.

A String dataType depicts a datatype of the column, for example, String, Integer, or other suitable datatype.

A String fieldLength indicates a field length of the column.

A Boolean mandatoryFlag describes whether the data in a column is mandatory. A String description discloses a detailed description of the column.

A String boxType shows the type of the field on the screen. For example, the object shows whether it is TextArea, ComboBox, and/or Label.

A String boxSize indicates the length of the field on the screen.

A Boolean primaryKeyFlag depicts whether the column is a primary key.

A String maxValue describes the maximum value that can be entered into the field on the screen.

A Map columnData describes a Map containing key, value pairs of String columnDataValue, and String columnDisplayDataValue. For instance, when a few of the columns can take only "Yes" or "No" values, the Map herein will be used to populate these kinds of values.

In addition to the above, the framework 100 can be used for configuration, user management, monitoring, querying transactions, and other suitable operations. In accordance with certain embodiments of the disclosed technology, the framework 100 can follow a dynamic content approach to develop the admin application. The dynamic information can include, but is not limited to, header message, footer message, reference table information, and the actions (functionalities) performed by the user.

Figure 2:
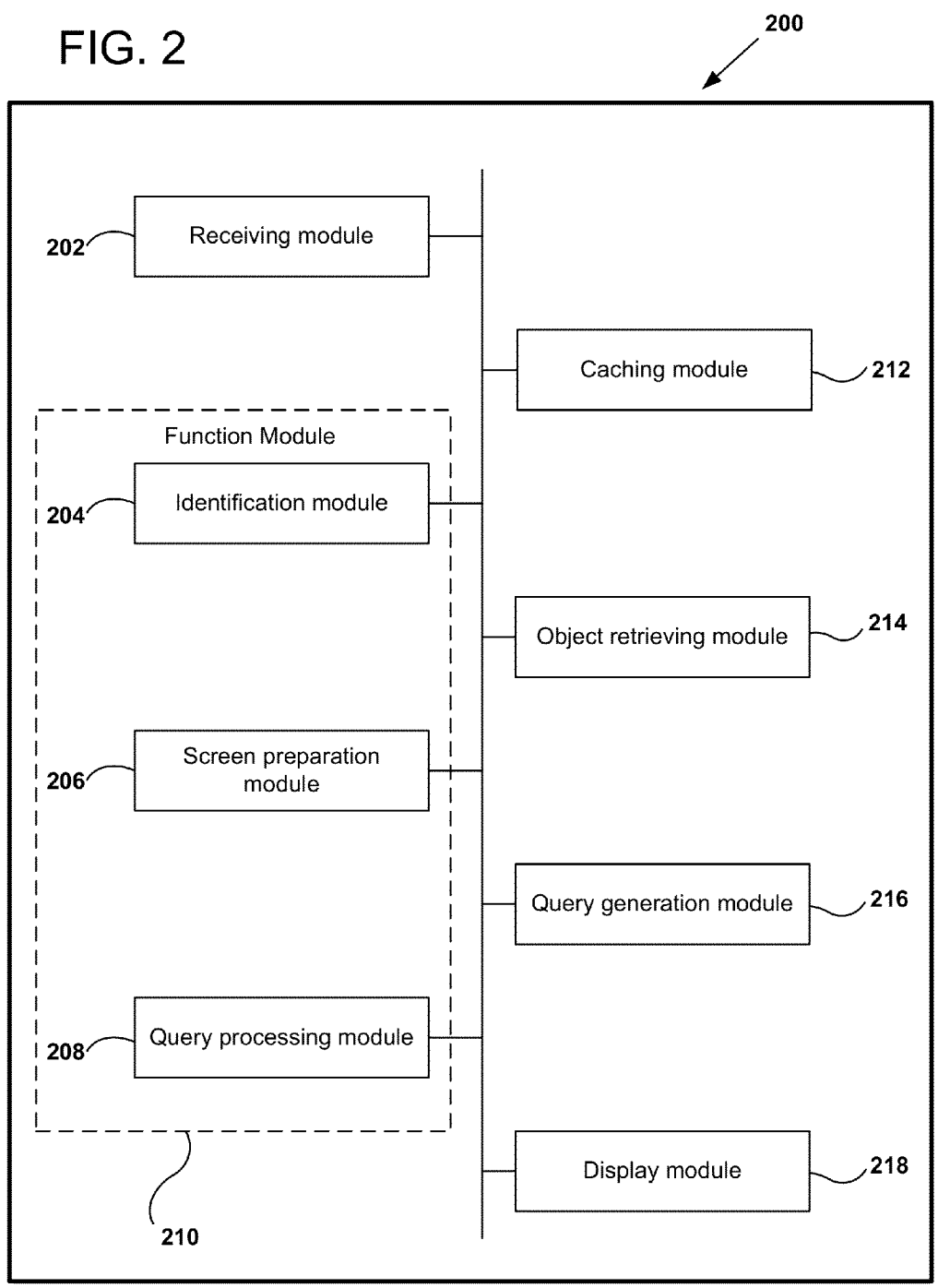
FIG. 2 is a block diagram that depicts various modules for managing a database having one or more tables, in accordance with certain embodiments of the disclosed technology.

FIG. 2 depicts a number of modules 200 for managing a database having one or more tables, in accordance with certain embodiments of the disclosed technology. The tables represent the master data of a business application. Examples of various types of business applications can include, but are not limited to, Human Resource Management (HRM), Supply Chain Management (SCM), Customer Relationship Management (CRM), Inventory Management, Enterprise Content Management (ECM), and Enterprise Resource Planning (ERP). More specifically, FIG. 2 is shown to include a receiving module 202, a function module 210, a caching module 212, an object retrieving module 214, a query generation module 216, and a display module 218. The function module 210 further includes an identification module 204, a screen preparation module 206, and a query processing module 208.

The receiving module 202 receives an input command from a user for maintaining a table of the one or more tables. These tables are stored in a database. Examples of various types of databases can include, but are not limited to, relational databases, operational databases, distributed databases, database warehouses, and end-user databases. Various examples of the input command can include but not limited to, View, Add, Update, and Delete. After receiving an input command from the user, a function module 210 processes the command. The processing includes identification of an Extensible Markup Language (XML) file corresponding to the table by identification module 204. Further, the XML file is identified based on a table Identifier corresponding to the table. In accordance with certain embodiments of the disclosed technology, the XML file is created in a pre-defined XML structure. The pre-defined XML structure can include, but is not limited to, at least one or more of the following: header messages, one or more messages, one or more queries, one or more variables, one or more field columns, one or more footer messages, and one or more input commands. While creating the XML file, one or more classes corresponding to the data present in the XML file are created. The classes can be created in a pre-defined programming language, for example, Java. In accordance with certain embodiment of the disclosed technology, these classes are already created and are present in ".Jar" file. Accordingly, the XML structure and class structure can be defined. Further, for each of the classes, one or more objects are created. In some examples, the method includes updating the XML file based on the one or more functionalities.

Based on the identified XML file and corresponding screen object, the screen preparation module 206 prepares a screen suitable for enabling the user to perform one or more functionalities corresponding to the received input command. Examples of functionalities that can be performed by the user include viewing data, adding data, updating data, and deleting data. Various examples of the screen presented to the user can include, but are not limited to, View screen, Add screen, Update screen, and Delete Screen. These screens are populated with the appropriate header and footer messages. The screen is prepared by using a screen object corresponding to the XML file as described above in conjunction with FIG. 1. The screen object further corresponds to the input command associated with the XML file. Thereafter, query processing module 208 processes a query corresponding to the input command for maintaining the table based on the functionalities. These queries are present in the XML file and the corresponding screen object. In accordance with certain embodiments of the disclosed technology, the query can be modified based on the user action and/or input. In some examples, the query can be defined as: "select employee_number, employee_name, department, location from employee", "update employee set employee_name='Mike Benson' where employee_number='1234'," "delete from employee where employee_number='1234', insert into employee values ('1234', 'Mike Benson', 'Marketing')".

The caching module 212 caches the data at the start of the application and/or server. In some examples, when the user performs functionalities such as add, update, delete, and view, the caching module 212 is used for storing the column name on screen, the column name on database, and query to be submitted to the database. The data corresponds to one or more commands associated with the table.

In accordance with certain embodiments of the disclosed technology, the objects in the cache are used to display data on the screen. In other embodiments of the disclosed technology, the objects in the cache are used to maintain data present in the database. Thereafter, the object retrieving module 214 retrieves a table object from the plurality of objects. The table object includes the screen objects and one or more parameters corresponding to the table. The table object further includes other screen objects corresponding to one or more input commands for maintaining the table. Thereafter, query generation module 216 generates the query using the XML file (and corresponding object) prior to executing the query. Subsequently, display module 218 displays one or more screens to the user for enabling the user to perform the functionalities.

In accordance with certain embodiments of the disclosed technology, these different screens and the corresponding functionalities are described below in detail.

View Screen

A view screen enables users to view data in the tables that are present in the database. To view a particular table, the user clicks on a table name to view records in the table. Once the user clicks on the table name, the underlying table id is used to retrieve a relevant AdminTableXMLVO object from HashMap in XMLInformation object. Thereafter, AdminScreenXMLVO viewScreen object is retrieved from the AdminTableXMLVO object. Thereafter, the view screen is prepared according to the data structure available in XML, and data is fetched from the corresponding table based on the query taken from the XML. The user can view any number of desired tables. For instance, the user can view table packaging types, as shown in the View screen 500 depicted in FIG. 5.

Add Screen

An add screen enables the user to add one or more records to the existing tables. In accordance with certain embodiments of the disclosed technology, the user can add one or more records to the tables in the database. When the user wishes to perform Add functionality, he or she clicks on the Add button as shown in FIG. 5. Accordingly, all the details related to Add functionality are retrieved from the AdminScreenXMLVO addScreen object. The AdminScreenXMLVO addScreen object prepares the Add screen for the user and consequently enables the user to add data in the database. Once a user adds the record on the screen and clicks on 'Add', the database table is updated using the query present in the XML file (for the corresponding table). Typically, Add functionality is performed when the new values are inputted for all the columns, such as Package Code, Package Name, Max Pieces, and Avg. max weight (for example, as shown in the Update/Add screen 600 depicted in the FIG. 6).

Update Screen

An update screen enables the user to update the existing records of the tables present in the database. When the user wishes to perform Update functionality, he or she clicks on the Update functionality. In particular, the user can update the data using the drop down menu as shown in FIG. 6. Pursuant to this, all the details related to update functionality will be retrieved from the AdminScreenXMLVO updateScreen object. The AdminScreenXMLVO updateScreen object prepares the Update screen for the user, and then enables the user to update data present in the database. Once the user updates the record on the screen and clicks on 'Update', the database table is updated using the query present in the XML file (for the corresponding table).

Delete Screen

A delete screen enables the user to delete one or more record(s) of the table present in the database. When the user wishes to perform delete functionality, he or she clicks on delete functionality, as shown in FIG. 5. Subsequently, all the details related to delete functionality will be retrieved from the AdminScreenXMLVO delete Screen object. Data associated with the AdminScreenXMLVO deleteScreen object helps in the actual deletion of the data present in the database. The database record is deleted using the query present in the XML file (for the corresponding table).

In accordance with certain embodiments of the disclosed technology, an exemplary data structure present in the XML file is shown below in Table 1. The XML structure shown below in Table 1 demonstrates various parameters such as headers, footers, messages, fields, columns, and their corresponding values.

TABLE 1

```
<?xml version="1.0" encoding="UTF-8" ?>
<DATABASE VIEWTYPE="VERTICAL" TABLEWIDTH="80%">
    <SELECT>
        <HEAD_MSG>
            <MSG>
                <![CDATA[ <center><font size="5"
```

TABLE 1-continued

```
><U><B>Currency
    Table</B></U></font></center> ]]>
        </MSG>
      </HEAD_MSG>
      <FIELD COLUMN="currency_cd" NAME="Currency Code"
PKEY="YES"    MANDATORY="YES" LENGTH="2" DATATYPE="CHAR"
BOXSIZE="2"   BOXTYPE="T" />
      <FIELD COLUMN="currency_nm" NAME="Currency Name"
    MANDATORY="YES" LENGTH="30" DATATYPE="CHAR" BOXSIZE="30"
    BOXTYPE="T" />
      <FIELD COLUMN="no_of_digits_right" NAME="Number Of Digits
Right"   PKEY="NO" MANDATORY="NO" LENGTH="4" DATATYPE="SMALLINT"
    BOXSIZE="4" BOXTYPE="T" MAXVALUE="32767" />
      <FIELD COLUMN="rate_conv_factor" NAME="Rate Conversion
Factor"   MANDATORY="YES" LENGTH="17" DATATYPE="Decimal(16,8)"
    BOXSIZE="17" BOXTYPE="T" MAXVALUE="99999999.99999999" />
      <QUERY>SELECT currency_cd, currency_nm,
no_of_digits_right,    rate_conv_factor FROM currency order by
currency_cd</QUERY>
    </SELECT>
    <ADD>
    <HEAD_MSG>
        <MSG>
          <![CDATA[ <center><font size="5"><U><B>Add Currency
              Table</B></U></font></center> ]]>
        </MSG>
      </HEAD_MSG>
    <QUERY>
        INSERT INTO currency VALUES (?,?,?,?)
        <VARIABLE SESSION="NO">currency_cd</VARIABLE>
        <VARIABLE SESSION="NO">currency_nm</VARIABLE>
        <VARIABLE SESSION="NO">no_of_digits_right</VARIABLE>
        <VARIABLE SESSION="NO">rate_conv_factor</VARIABLE>
      </QUERY>
    </ADD>
    <DELETE>
      <QUERY>
        DELETE FROM currency WHERE currency_cd IN ( ? )
        <VARIABLE SESSION="NO">currency_cd</VARIABLE>
      </QUERY>
    </DELETE>
    <UPDATE>
        <HEAD_MSG>
          <MSG>
            <![CDATA[ <center><font size="5" ><U><B>Update
    Currency Master Table</B></U></font></center> ]]>
          </MSG>
        </HEAD_MSG>
      <QUERY>
        UPDATE currency SET currency_nm = ? ,
no_of_digits_right = ? ,    rate_conv_factor = ? WHERE currency_cd
= ?
        <VARIABLE SESSION="NO">currency_nm</VARIABLE>
        <VARIABLE
SESSION="NO">no_of_digits_right</VARIABLE>
        <VARIABLE SESSION="NO">rate_conv_factor</VARIABLE>
        <VARIABLE SESSION="NO">currency_cd</VARIABLE>
      </QUERY>
    </UPDATE>
</DATABASE>
```

The structure or format of the XML file as described above is exemplary in nature and is simply used to facilitate the description of the disclosed technology. The structure of the XML file can vary based on various requirements. The structure of the XML file may or may not represent the completeness of a component, but is sufficiently described in a sequence corresponding to the features described above. Thus, it is clear that the disclosed technology is not limited to the embodiments described herein.

Figure 3:
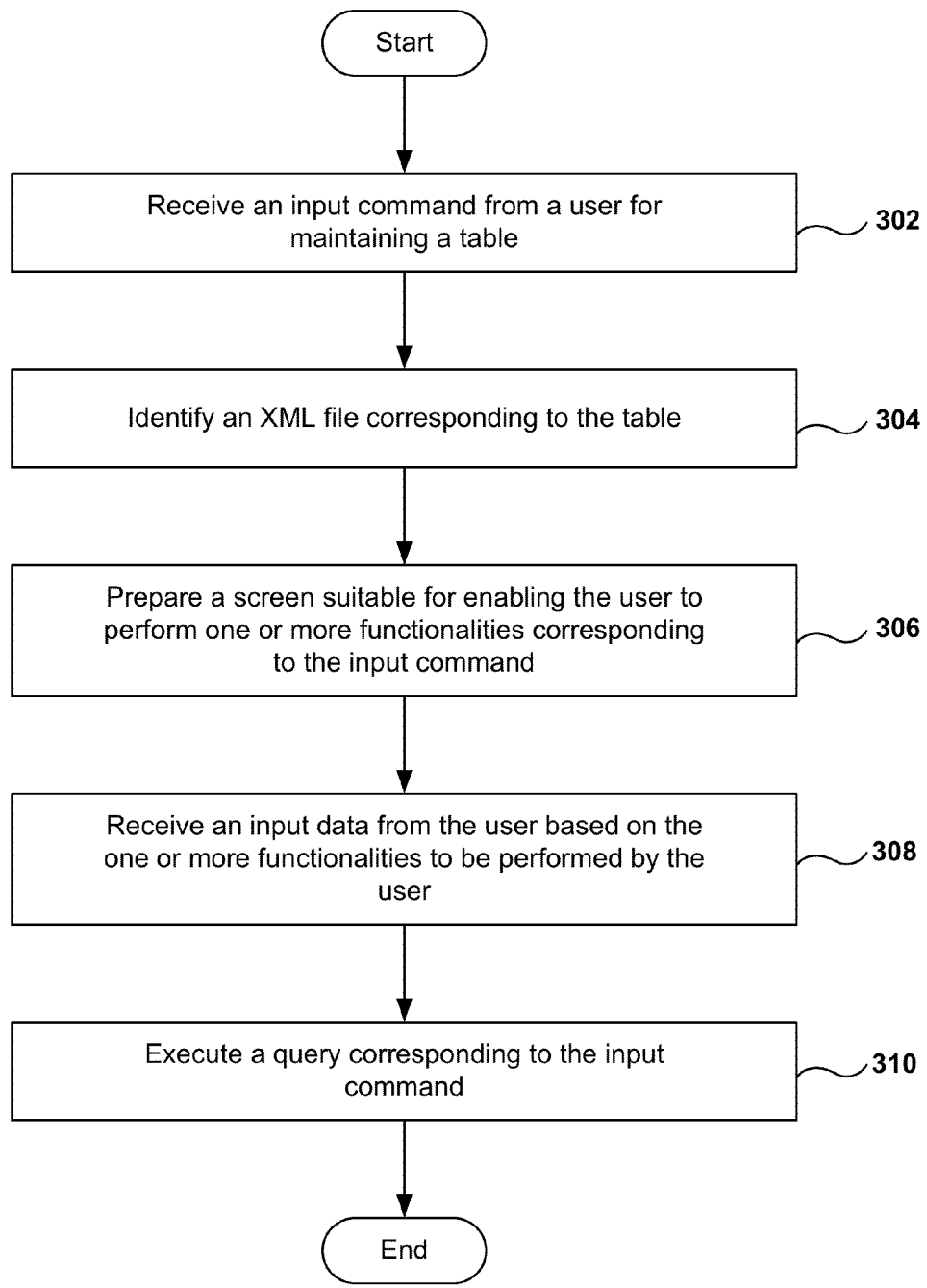
FIG. 3 is a flowchart of an exemplary method for managing a database having one or more tables, in accordance with certain embodiments of the disclosed technology.

FIG. 3 is a flowchart 300 outlining an exemplary method for managing a database having one or more tables, in accordance with certain embodiments of the disclosed technology.

The method depicted in FIG. 3 includes receiving an input command from the user for maintaining a table of the one or more tables, at process block 302. Various examples of the input command can include View, Add, Update, and Delete. The tables are present in the database and the information about them is written in an XML file. Each table is associated with the corresponding table identifier. After receiving the input command, at process block 304, an Extensible Markup Language (XML) file corresponding to the table is identified, based on the input command. The XML file is identified based on a table Identifier corresponding to the table that is to be maintained. The XML file is created in a pre-defined XML structure as above. Thereafter, at process block 306, a screen suitable for enabling the user to perform one or more functionalities corresponding to the input command is prepared. The screen is prepared by using a screen object (discussed above) corresponding to the XML file. The screen object further corresponds to the input command associated with the XML file. For instance, if the input command relates to Update, then the corresponding Update screen is prepared and will be presented to the user. In other examples, if the input command relates to View, then the corresponding View screen is prepared and shown to the user.

At the time of screen preparation, one or more objects corresponding to the data present in the XML file are referred (which are already cached at the start of the application/server). The data herein corresponds to one or more commands associated with the table. After the objects are cached, an object corresponding to the table for which the command is received is retrieved. Further, the table object includes the screen object and one or more parameters corresponding to the table. The table object comprises other screen objects corresponding to the input commands for maintaining the table. Then at process block 308, input data from the user based on the one or more functionalities to be performed by the user is received. For example, if the user clicks on add functionality, then before process block 310, the user adds a new employee data on the screen and then acts associated with process block 310 are executed. Further, the method of FIG. 3 includes generating a query prior to executing it. The query is generated by using the XML file. At process block 310, a query corresponding to the input command is executed for maintaining the table based on the functionalities, including View, Add, Update, and Delete.

In accordance with certain embodiments of the disclosed technology, the XML file has a pre-defined XML structure. The pre-defined XML structure includes one or more header messages, one or more messages, one or more queries, one or more variables, one or more field columns, one or more footer messages, and one or more input commands as shown in the above exemplary format. While creating the XML file, one or more classes and the corresponding objects are also created. In accordance with certain embodiments of the disclosed technology, the set of classes are prepared as per the structure of XML file and different objects are created for each XML file and/or table using the same set of classes. In accordance with certain embodiments of the disclosed technology, objects are created using the XML file when the application or server starts. The classes can be created in any of a number of suitable programming languages, which can include, but are not limited to Java, Visual Basic, and C#.

Figure 4A:
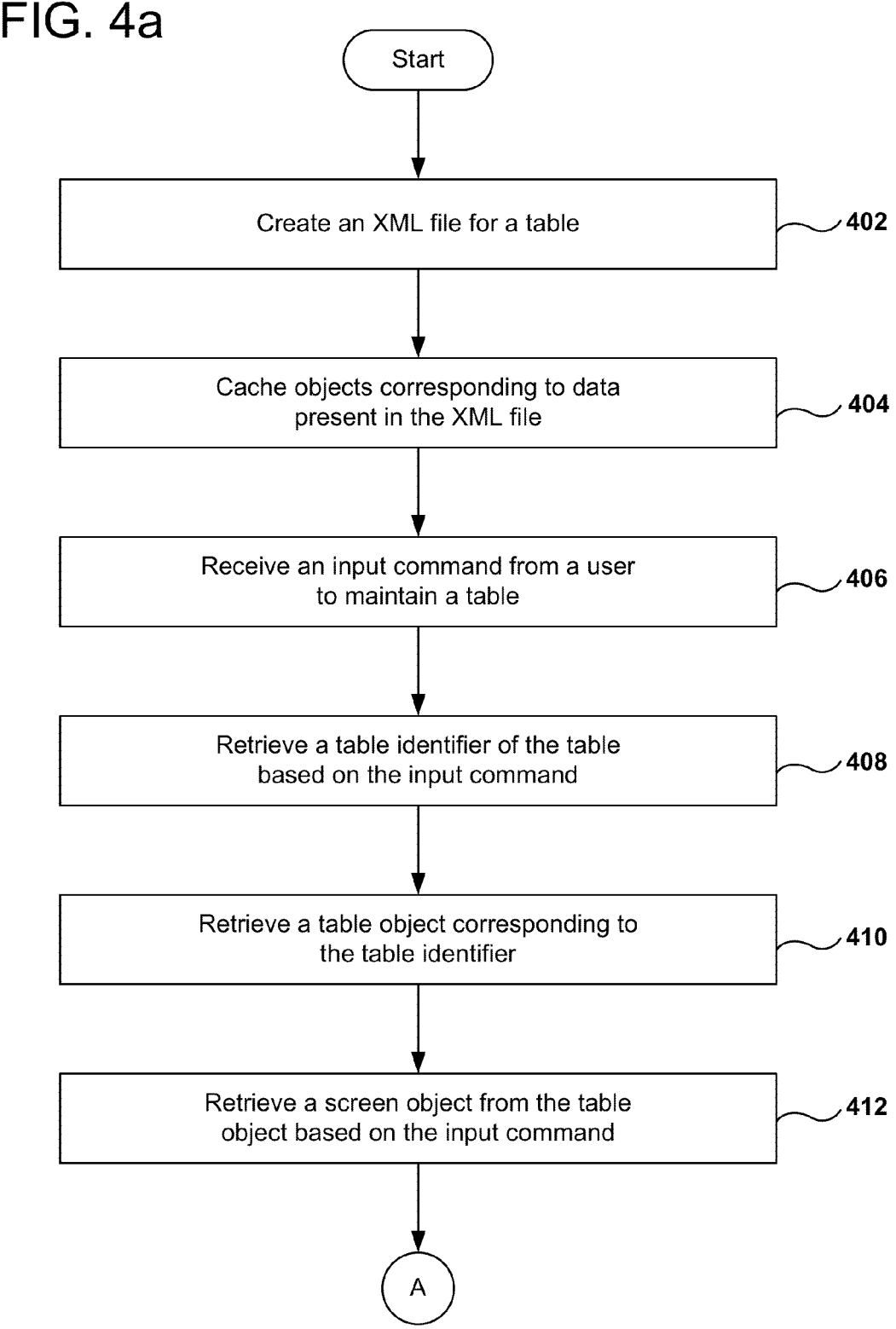
FIGS. 4a and 4b are flowcharts of an exemplary method for managing a database having one or more tables, in accordance with certain embodiments of the disclosed technology.
Figure 4B:
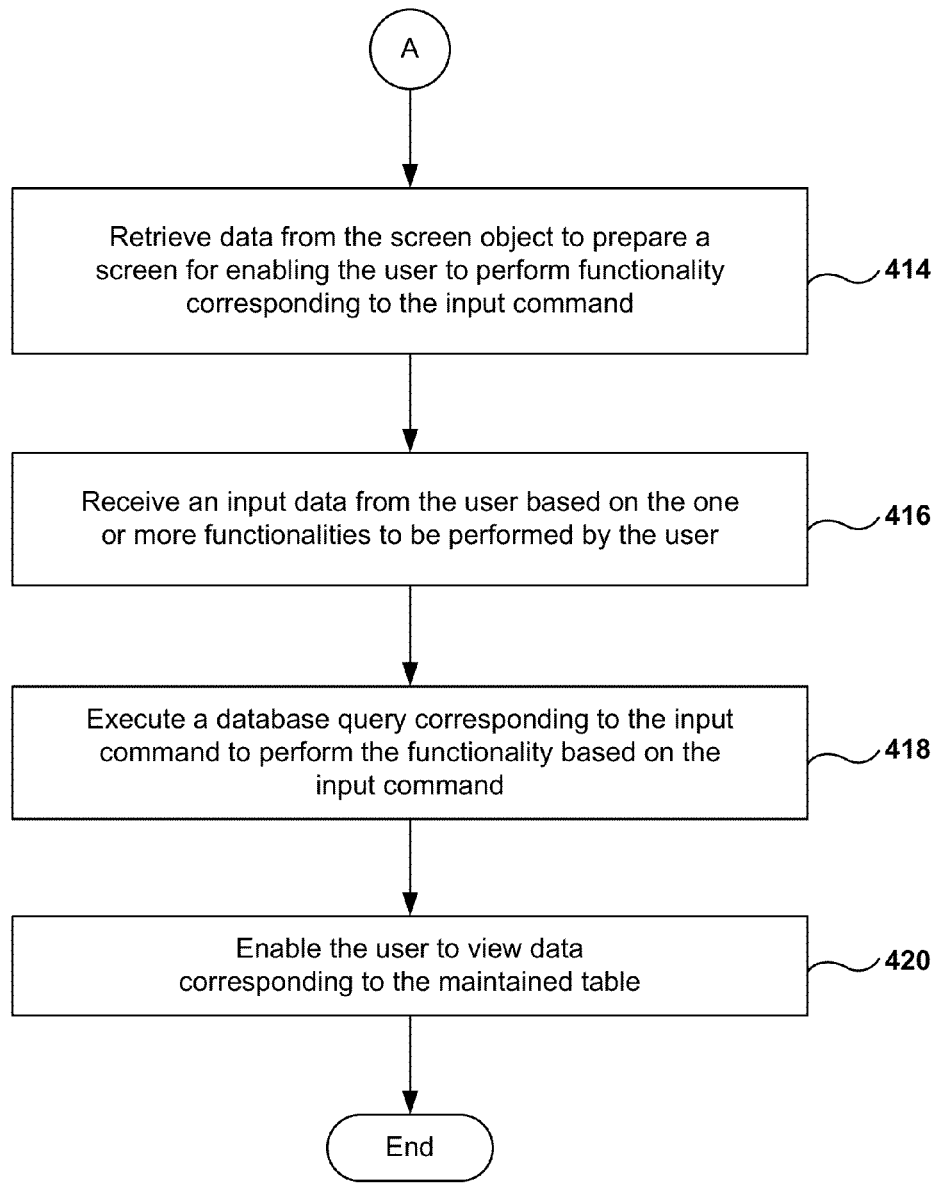

FIGS. 4a and 4b depict flowcharts 400 and 401 of an exemplary method for managing a database having one or more tables, in accordance with certain embodiments of the disclosed technology.

One utility of the method of FIGS. 4a and 4b is to manage data in the tables present in a database. These tables represent the master data of a business application. Further, information about these tables is also present in the XML file. Each table is associated with its corresponding table identifier. To start with, at process block 402, the method includes creating an XML file for each table present in a database. There are also one or more classes related to XML structure (the same set of classes will be re-used for all XML files and/or tables, and there is no need to create separate classes if a new XML file and/or table is added and/or modified). The classes can be created in any suitable programming language, such as Java. Thereafter, at process block 404, objects corresponding to the data present in the XML file are cached. Typically, these acts are performed when the application starts or whenever there is an update in XML files. In accordance with certain embodiments of the disclosed technology, the XML file is prepared in a pre-defined XML structure. Further, the XML file is updated whenever required.

Thereafter, at process block 406, an input command is received from a user. The command is received to maintain a table from a plurality of tables present in the database. After receiving the command, at process block 408, a table identifier of the table based on the input command is retrieved. Thereafter, at process block 410, a table object such as AdminTableXMLVO, corresponding to the table identifier, is retrieved. From the retrieved table object, at process block 412, a screen object based on the input command is retrieved. The screen object is retrieved based on the input command of the user. For instance, an AdminScreenXMLVO viewScreen object is retrieved when the user indicates a desire to view the table. According to another example, an AdminScreenXMLVO addScreen object is retrieved when the user indicates a desire to add one or more records in the database. Thereafter, at process block 414, data from the screen object is retrieved to prepare a screen for enabling the user to perform functionality corresponding to the input command. Examples of the functionality that can be performed by the user include, but are not limited to, View, Add, Update, and Delete. Then, at process block 416, input data from the user based on the one or more functionalities to be performed by the user is received. Thereafter, at process block 418, a database query corresponding to the input command to perform the functionality is executed. Subsequently, at process block 420, the user is enabled to view data corresponding to the table and can accordingly maintain it.

In accordance with an exemplary embodiment of the disclosed technology, a list of objects and parameters defined in an example AdminTableXMLVO object is shown below in Table 2.

TABLE 2

AdminTableXMLVO
    boolean verticalView
    boolean multiplePrimaryKeyInView
    String containStaticData
    String tableWidth
    AdminScreenXMLVO viewScreen
    AdminScreenXMLVO updateScreen
    AdminScreenXMLVO addScreen
    AdminScreenXMLVO deleteScreen In accordance with an exemplary embodiment of the disclosed technology, a number of objects and parameters defined in an AdminScreenXMLVO object are shown below in Table 3.

TABLE 3

AdminScreenXMLVO
    List footerMessages
        MessageVO
            String message
        PreparedQueryVO
            String Query
            List Parameters
                ParameterVO
                    String name
                    boolean inSession
                    boolean blobData In accordance with an exemplary embodiment of the disclosed technology, various parameters of List headerMessages objects are described below in Table 4.

TABLE 4

List headerMessages
    MessageVO
        String message
        PreparedQueryVO
            String Query
            List Parameters
                ParameterVO
                    String name
                    boolean inSession
                    boolean blobData In accordance with an exemplary embodiment of the disclosed technology, various parameters of PreparedQueryVO are described below in Table 5.

TABLE 5

PreparedQueryVO
    String Query
    List Parameters
        ParameterVO
            String name
            boolean inSession
            boolean blobData In accordance with an exemplary embodiment of the disclosed technology, a number of variables corresponding to List columns object are defined below in Table 6.

TABLE 6

List columns
    ColumnXMLVO
        ColumnVO
            String columnName
            String displayName
            String dataType
            String fieldLength
            boolean mandatoryFlag
            String description
            String boxType
            String boxSize
            boolean primaryKeyFlag
            String maxValue
            Map columnData
                String columnDataValue
                String columnDisplayDataValue In accordance with an exemplary embodiment of the disclosed technology, a number of variables corresponding to PreparedQueryVO object are listed below in Table 7

TABLE 7

PreparedQueryVO
    String Query
    List Parameters
        ParameterVO
            String name
            boolean inSession
            boolean blobData In accordance with certain embodiments of the disclosed technology, a workflow of various operations such as View, Add, Update, and Delete are described below in further detail.

Exemplary Workflow for View Data Tables

In one exemplary workflow for performing a view data tables operation, a user initially inputs a command for viewing a table. Thereafter, the corresponding table identifier is retrieved. Next, the object corresponding to the table id, such as AdminTableXMLVO object, is obtained. Once the object is retrieved, the corresponding screen object, such as AdminScreenXMLVO, is obtained. This screen object can be retrieved by calling getViewScreen. Following this, the header and the footer messages are obtained by calling getHeaderMessages and getFooterMessages. Next, the details of all the columns corresponding to the table id are retrieved by calling getColumns. Each ColumnXMLVO object contained in the List object has detailed information about each column. Following this, query preparation is performed by calling getPreparedQueryVO method. Thereafter, the database query can be submitted to the database and table view results can be obtained. The data retrieved is stored in objects and can be displayed on the view screen while preparing the view for user action. A similar process is followed when the user wishes to view other tables present in the database.

Workflow for Add Data Tables

The Add Data tables workflow is described herein based on the assumption that the user is already viewing a view screen page. In one exemplary workflow for performing an Add Data tables action, the user initially clicks on an "Add" control button on the View Screen page, as shown in FIG. 5. After receiving the Add command for a table, the corresponding table id is retrieved. Thereafter, the corresponding object, such as an AdminTableXMLVO object from the Framework HashMap against the Table Id, is retrieved. From the AdminTableXMLVO, the corresponding screen object such as AdminScreenXMLVO addScreen object is retrieved by calling getAddScreen function. Pursuant to this, the appropriate header and footer messages are retrieved by calling getHeaderMessages and getFooterMessages method. Further, details of all the columns to be shown on the Add screen as described above are obtained. Accordingly, an Add screen is shown to the user. Here, the user needs to enter the data that needs to be added and click on the "Add" button/control to add the data on the screen in the database. Subsequent to this, PreparedQueryVO object is obtained from AdminScreenXMLVO object by calling getPreparedQueryVO method. Finally, the database query can be fired and the data can be added. Once the data is added, the user will be shown the view screen.

Workflow for Update Data Tables

The Update Data tables workflow is described herein based on the assumption that the user is already on view screen page. In one exemplary workflow for performing an Update Data tables action, the user initially selects a record to be updated and can accordingly click on the Update button on the View Screen. Following this, the table id corresponding to the selected table record is obtained. Once the table id is obtained, the corresponding AdminTableXMLVO object from the framework HashMap against the key table id is retrieved. Further, the corresponding screen object such as AdminScreenXMLVO updateScreen object is obtained through getUpdateScreen method. Thereafter, the appropriate header and footer messages are retrieved by calling getHeaderMessages and getFooterMessages method. Accordingly, the details of all the columns to be shown on the Update screen are obtained as above, and accordingly displayed on the Update screen displayed to the user. Thereafter, the user enters the updates and can click on the Update button/control to update the data on the screen. The rest of the process is similar to those described for the Add Data tables workflow described above. Once the data is updated, the user is shown the view screen.

Workflow for Delete Data Tables

The Delete Data tables workflow is described herein based on the assumption that the user is already on view screen page. In one exemplary workflow for performing a Delete Data tables action, the user initially selects a record to be deleted and then can accordingly click on the Delete button on the View Screen. Thereafter, the table id corresponding to the selected table record is obtained. Once the table id is obtained, the corresponding AdminTableXMLVO object from the framework HashMap against the key table id is retrieved. Further, an appropriate screen object, such as an AdminScreenXMLVO deleteScreen object, is retrieved by calling a getDeleteScreen method. Following this, a PreparedQueryVO object is retrieved by calling getPreparedQueryVO method. Thereafter, record and/or records ids selected by user to be deleted are selected from the database. Using the Prepared Query as above, the database query can be submitted and the data can be deleted. Once the data is deleted, the user will be shown the view screen.

The disclosed technology as described above has a number of desirable features. The disclosed technology facilitates a framework for managing a database having a plurality of tables, such as the master data. The framework reduces development effort, time, and cost to a great extent. This further minimizes code duplication and thus, business applications can be maintained easily. Moreover, the framework can be used across different IT and/or software applications.

Example Computing Environment

The methods and systems for managing a database having a plurality of tables, or any of its components, as described herein, can be embodied in the form of a computer system. Typical examples of a computer system include a general-purpose computer, a programmed microprocessor, a micro-controller, a peripheral integrated circuit element, and other devices or arrangements of devices that are capable of implementing the acts that constitute the presently disclosed methods.

FIG. 7 illustrates a generalized example of a suitable computing environment 700 in which described embodiments, techniques, and technologies can be implemented. For example, the computing environment 700 can implement methods and systems for managing a database having a plurality of tables, or any of its components, as can be used in accordance with certain embodiments of the disclosed technology.

The computing environment 700 is not intended to suggest any limitation as to scope of use or functionality of the technology, as the technology can be implemented in diverse general-purpose or special-purpose computing environments. For example, the disclosed technology can be implemented with other computer system configurations, including hand held devices, multiprocessor systems, microprocessor-based or programmable consumer electronics, network PCs, minicomputers, mainframe computers, and the like. The disclosed technology can also be practiced in distributed computing environments where tasks are performed by remote processing devices that are linked through a communications network. In a distributed computing environment, program modules can be located in both local and remote memory storage devices.

With reference to FIG. 7, the computing environment 700 includes at least one central processing unit 710 and memory 720. In FIG. 7, this basic configuration 730 is included within a dashed line. The central processing unit 710 executes computer-executable instructions and can be a real or a virtual processor (e.g., ultimately executed on processor hardware). In a multi-processing system, multiple processing units execute computer-executable instructions to increase processing power and as such, multiple processors can be running simultaneously. The memory 720 can be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment can have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 can be removable or non-removable, and includes magnetic disks, magnetic tapes or cassettes, CD-ROMs, CD-RWs, DVDs, or any other medium which can be used to store information and that can be accessed within the computing environment 700. The storage 740 stores instructions for the software 780, which can implement technologies described herein.

The input device(s) 750 can be a touch input device, such as a keyboard, keypad, mouse, touch screen display, pen, or trackball, a voice input device, a scanning device, or another device, that provides input to the computing environment 700. For audio, the input device(s) 750 can be a sound card or similar device that accepts audio input in analog or digital form, or a CD-ROM reader that provides audio samples to the computing environment 700. The output device(s) 760 can be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 790. For example, methods for managing a database having a plurality of tables can be performed on servers located in the computing cloud 790.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Any of the methods described herein can be implemented by computer-executable instructions stored in one or more computer-readable storage devices (e.g., memory, magnetic storage, optical storage, or the like). Such instructions can cause a computer to perform the method.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software can be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method for managing a database having one or more tables, the method comprising:
    generating for a database table comprising business data, an Extensible Markup Language (XML) file corresponding to the database table, wherein the XML file:
    identifies fields within the database table; and
    includes queries that are performable on the database table in response to user input;
    parsing the generated XML file and generating one or more data objects based on information parsed from the generated XML file, wherein each of the generated one or more data objects are associated with the generated XML file, at least one of the generated one or more data objects are implementable for preparing a user interface screen for the database table corresponding to the XML file, and at least one of the generated one or more data objects includes:
    the included queries that are performable on the database table in response to user input; and
    instructions for executing data operations on the database table corresponding to the XML file;
    receiving an input command from a user for executing a data operation on the database table;
    identifying from among a plurality of XML files, the generated XML file corresponding to the database table as identified in the input command;
    preparing a user interface screen suitable for enabling the user to perform the data operation identified in the input command, wherein the user interface screen is prepared by utilizing data within one or more selected data objects associated with the XML file and selection of the one or more selected objects is based on the data operation identified in the input command; and
    responsive to the data operation identified in the input command, executing a query corresponding to the input command for maintaining the database table, wherein the executed query is generated based on query information within the XML file corresponding to the database table identified in the input command.

2. The method of claim 1, wherein the input command corresponds to at least one or more selected from the group consisting of the following operations on data present in the table: viewing, adding, deleting, and updating.

3. The method of claim 1, wherein the XML file is developed in a pre-defined XML structure, the pre-defined XML structure comprising one or more header messages, one or more messages, one or more queries, one or more variables, one or more field columns, one or more footer messages, and one or more input commands.

4. The method of claim 3, further comprising creating one or more classes corresponding to data present in the XML file, wherein the one or more classes are created in a pre-defined programming language.

5. The method of claim 4, wherein the generated one or more data objects correspond to each of the one or more classes.

6. The method of claim 1, wherein the XML file is identified based on a table identifier corresponding to the table.

7. The method of claim 1, wherein the data operation identified in the input command comprises at least one or more selected from the group consisting of the following operations on data in the table: viewing, adding, updating, and deleting.

8. The method of claim 1, further comprising caching a plurality of objects corresponding to data present in the XML file, wherein the data corresponds to one or more commands associated with the table.

9. The method of claim 8, further comprising retrieving a table object from the plurality of objects, the table object comprising a screen object and one or more parameters corresponding to the table.

10. The method of claim 9, wherein the table object comprises other screen objects corresponding to one or more input commands for maintaining the table.

11. The method of claim 1, further comprising generating a query prior to the executing the query, the query being generated by utilizing the XML file.

12. The method of claim 1, further comprising updating the XML file based on the data operation identified in the input command.

13. A system comprising:
    one or more processors;
    a database having one or more tables;
    an Extensible Markup Language (XML) file corresponding to a database table comprising business data within the database, wherein the XML file:
    identifies fields within the database table; and
    includes queries that are performable on the database table in response to user input;
    one or more data objects generated by parsing the XML file and basing the one or more data objects on information parsed from the XML file, wherein each of the generated one or more data objects are associated with the XML file, at least one of the generated one or more data objects are implementable for preparing a user interface screen for the database datable corresponding to the XML file, and at least one of the generated one or more data objects includes:
    the included queries that are performable on the database table in response to user input; and
    instructions for executing data operations on the database table corresponding to the XML file;
    one or more non-transitory computer-readable storage media storing computer readable instructions that when executed by the processors cause the processors to manage the database using:
    a receiving module configured to receive an input command from a user for executing a data operation on the database table; and a function module configured for processing the input command for maintaining the database table, the function module comprising:

an identification module configured for identifying from among a plurality of XML files, the XML file corresponding to the database table as identified in the input command, a screen preparation module configured to prepare a user interface screen suitable for enabling the user to perform the data operation identified in the input command, wherein the user interface screen is prepared by utilizing data within one or more selected data objects associated with the XML file, and selection of the one or more selected objects is based on the data operation identified in the input command; and a query processing module configured to respond to the data operation identified in the input command by executing a query for maintaining the database table wherein the executed query is generated based on query information within the XML file corresponding to the database table identified within the input command.

14. The system of claim 13, wherein the input command corresponds to at least one or more selected from the group consisting of the following operations on data present in the table: viewing, adding, deleting, and updating.

15. The system of claim 13, wherein the XML file is developed in a pre-defined XML structure, the pre-defined XML structure comprising one or more header messages, one or more messages, one or more queries, one or more variables, one or more field columns, one or more footer messages, and one or more input commands.

16. The system of claim 13, wherein one or more classes are created corresponding to data present in the XML file, wherein the one or more classes are created in a pre-defined programming language.

17. The system of claim 16, wherein the generated one or more objects correspond to each of the one or more classes.

18. The system of claim 13, wherein the identification module identifies the XML file based on a table Identifier corresponding to the table.

19. The system of claim 13, further comprising a caching module configured for caching a plurality of objects corresponding to data present in the XML file, wherein the data corresponds to one or more commands associated with the table.

20. The system of claim 13, further comprising an object retrieving module configured for retrieving a table object from the plurality of objects, the table object comprising a screen object and one or more parameters corresponding to the table.

21. The system of claim 20, wherein the table object comprises other screen objects corresponding to one or more input commands for maintaining the table.

22. The system of claim 13, further comprising a query generation module, the query generation module configured for generating the query prior to executing the query, the query being generated by utilizing the XML file.

23. The system of claim 13, wherein the XML file is updated based on the data operation identified in the input command.

24. The system of claim 13, further comprising a display module configured for displaying the screen to the user for enabling the user to perform the data operation identified in the input command.

25. The system of claim 24, wherein the display module enables the user to view data, add data, update data and delete data corresponding to the table.

26. A computer program product for use with a computer, the computer program product comprising a non-transitory computer readable storage medium having computer executable program code embodied therein for managing a database having one or more tables, the computer executable program code comprising:

program instructions for generating for a database table comprising business data, an Extensible Markup Language (XML) file corresponding to the table, wherein the XML file:

identifies fields within the database table; and includes queries that are performable on the database table in response to user input;

program instructions for parsing the generated XML file and generating one or more data objects based on information parsed from the generated XML file, wherein each of the generated one or more data objects are associated with the generated XML file, at least one of the generated one or more data objects are implementable for preparing a user interface screen for the database table corresponding to the XML file, and at least one of the generated one or more data objects includes:

the included queries that are performable on the database table in response to user input; and instructions for executing data operations on the database table corresponding to the XML file;

program instructions for receiving an input command from a user for executing a data operation on the database table;

program instructions for identifying from among a plurality of XML files, the generated XML file corresponding to the database table as identified in the input command;

program instructions for preparing a user interface screen suitable for enabling the user to perform the data operation identified in the input command, wherein the user interface screen is prepared by utilizing data within one or more selected data objects associated with the XML file and selection of the one or more selected objects is based on the data operation identified in the input command; and program instructions for responding to the data operation identified in the input command by executing a query corresponding to the input command for maintaining the database table wherein the executed query is generated based on query information within the XML file corresponding to the database table identified in the input command.

27. The computer program product of claim 26, wherein the input command corresponds to at least one or more selected from the group consisting of the following operations performed on data present in the table: viewing, adding, deleting, and updating.

28. The computer program product of claim 26, wherein the XML file is identified based on a table identifier corresponding to the table.

29. The computer program product of claim 26, wherein the data operation identified in the input command comprises at least one or more selected from the group consisting of the following operations on data in the table: viewing, adding, updating, and deleting.

30. The computer program product of claim 26, wherein the computer program code further comprises program instructions for caching a plurality of objects corresponding to data present in the XML file, wherein the data corresponds to one or more commands associated with the table.

31. The computer program product of claim 30, wherein the computer program code further comprises program instructions for retrieving a table object from the plurality of objects, the table object comprising a screen object and one or more parameters corresponding to the table.

32. The computer program product of claim 31, wherein the table object comprises other screen objects corresponding to one or more input commands for maintaining the table.

33. The computer program product of claim 26, wherein the computer program code further comprises program instructions for generating the query prior to executing the query, the query being generated by utilizing the XML file.

34. The computer program product of claim 26, wherein the XML file is updated based on the data operation identified in the input command.

35. The computer program product of claim 26, wherein the computer program code further comprises program instructions for enabling the user to view data, add data, update data and delete data corresponding to the table.

36. The method of claim 1, wherein the database comprises a plurality of tables, each having an XML file corresponding thereto.

37. The method of claim 36, wherein each XML file includes rules for at least one of data persistence or user interface design for the corresponding table.

38. The system of claim 13, wherein the database comprises a plurality of tables, each having an XML file corresponding thereto.

39. The system of claim 38, wherein each XML file includes rules for at least one of data persistence or user interface design for the corresponding table.

40. The computer program product of claim 26, wherein the database comprises a plurality of tables, each having an XML file corresponding thereto.

41. The computer program product of claim 40, wherein each XML file includes rules for at least one of data persistence or user interface design for the corresponding table.

* * * * *